US011029086B2

(12) United States Patent
Kong et al.

(10) Patent No.: US 11,029,086 B2
(45) Date of Patent: Jun. 8, 2021

(54) METHOD AND APPARATUS FOR REDUCING PROCESS DISTURBANCES DURING PRESSURIZATION OF AN ADSORBER IN AN AIR SEPARATION UNIT

(71) Applicant: L'Air Liquide, Societe Anonyme pour l'Etude et l'Exploitation des Procedes Georges Claude, Paris (FR)

(72) Inventors: Paul Kong, Sugar Land, TX (US); Minh Huy Pham, Houston, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 251 days.

(21) Appl. No.: 16/229,473

(22) Filed: Dec. 21, 2018

(65) Prior Publication Data
US 2020/0200472 A1    Jun. 25, 2020

(51) Int. Cl.
*B01D 53/04* (2006.01)
*B01D 53/053* (2006.01)
(Continued)

(52) U.S. Cl.
CPC .......... *F25J 3/04181* (2013.01); *B01D 53/04* (2013.01); *B01D 53/047* (2013.01);
(Continued)

(58) Field of Classification Search
CPC .. F25J 3/04181; F25J 3/04242; F25J 3/04018; F25J 3/0424; F25J 2205/72; F25J 2245/40; F25J 2290/62
(Continued)

(56) References Cited

U.S. PATENT DOCUMENTS 3,738,084 A   6/1973  Simonet et al.
4,152,130 A   5/1979  Theobald
(Continued)

FOREIGN PATENT DOCUMENTS

DE    20 2004 013214    11/2004
DE    2020 0401 3214    11/2004
(Continued)

OTHER PUBLICATIONS

EP Search Report for EP 19217332, dated Apr. 23, 2020.
(Continued)

*Primary Examiner* — Frank M Lawrence, Jr.
(74) *Attorney, Agent, or Firm* — Justin K. Murray

(57) ABSTRACT

A method for reducing process disturbances during pressurization of an adsorber in an air separation unit is provided, in which the air separation unit includes a front end purification unit and an air buffer tank. In one embodiment, the method can include the steps of: pressurizing a first adsorber while a second adsorber operates in an adsorption cycle, wherein the step of pressurizing the first adsorber further includes the steps of withdrawing a pressurized air stream from the air buffer tank and introducing the pressurized air stream to the first adsorber until the first adsorber is at a target pressure, wherein the air buffer tank is in fluid communication with the booster air compressor, wherein the method further includes the step of continually sending a first portion of air flow from the booster air compressor to the air buffer tank and continually sending a second portion of air flow from the booster air compressor to a system of columns within a cold box for rectification therein.

9 Claims, 2 Drawing Sheets

(51) Int. Cl.
*F25J 3/04* (2006.01)
*B01D 53/047* (2006.01)

(52) U.S. Cl.
CPC ........ *B01D 53/053* (2013.01); *F25J 3/04018* (2013.01); *F25J 3/04024* (2013.01); *B01D 2256/10* (2013.01); *B01D 2257/504* (2013.01); *B01D 2257/80* (2013.01); *B01D 2258/06* (2013.01); *B01D 2259/40013* (2013.01)

(58) Field of Classification Search
USPC ...... 95/96, 117, 139, 148; 96/121, 130, 134, 96/143, 144; 62/640, 643, 644
See application file for complete search history.

(56) References Cited

U.S. PATENT DOCUMENTS

| | | | |
|---|---|---|---|
| 4,233,038 A | 11/1980 | Tao | |
| 5,137,548 A | 8/1992 | Grenier et al. | |
| 5,518,526 A * | 5/1996 | Baksh | B01D 53/0476 95/100 |
| 5,531,808 A | 7/1996 | Ojo et al. | |
| 5,584,194 A * | 12/1996 | Gardner | C01B 23/0094 62/615 |
| 5,587,003 A | 12/1996 | Bulow et al. | |
| 5,689,974 A | 11/1997 | Fujita et al. | |
| 5,906,674 A | 5/1999 | Tan et al. | |
| 6,073,463 A | 6/2000 | Espie | |
| 6,155,078 A * | 12/2000 | Miyashita | F25J 3/04157 62/643 |
| 6,393,867 B1 | 5/2002 | Guillard | |
| 6,599,347 B2 | 7/2003 | Kalbassi et al. | |
| 6,607,582 B2 | 8/2003 | Massimo et al. | |
| 6,821,316 B2 | 11/2004 | Guillard et al. | |
| 7,846,237 B2 | 12/2010 | Wright et al. | |
| 9,795,915 B2 | 10/2017 | Kalbassi et al. | |
| 10,035,099 B2 | 7/2018 | Yoshikawa et al. | |
| 2004/0221612 A1 | 11/2004 | Jaouani et al. | |
| 2010/0024640 A1 | 2/2010 | Blouin | |
| 2013/0319228 A1 | 12/2013 | Golden et al. | |
| 2014/0013798 A1 * | 1/2014 | Le Bot | F25J 3/04054 62/643 |
| 2017/0087505 A1 | 3/2017 | Hashi et al. | |
| 2017/0276428 A1 | 9/2017 | Kong et al. | |

FOREIGN PATENT DOCUMENTS

| | | |
|---|---|---|
| EP | 0 004 465 | 10/1979 |
| FR | 2 849 172 | 6/2004 |
| WO | WO 2007 033 838 | 3/2007 |

OTHER PUBLICATIONS

"Oxygen Enrichment of Air: Process Developments and Economic Trends," Research Disclosure, Kenneth Mason Publications, No. 417, Jan. 1, 1999, pp. 94-101.
EP Search Report for EP 19217421, dated Apr. 24, 2020.
Anonymous, "Method of Repressurising the Pretreatment PSA of a Cryogenic Air Separation Unit," originally published in Research Disclosure, Jun. 1999, p. 640, publ. No. 42160; IP.Com Prior Art Database Technical Disclosure, IP.com Number: IPCOM000019388D, IP.com Electronic Publication Date: Sep. 12, 2003.

* cited by examiner

METHOD AND APPARATUS FOR REDUCING PROCESS DISTURBANCES DURING PRESSURIZATION OF AN ADSORBER IN AN AIR SEPARATION UNIT

TECHNICAL FIELD OF THE INVENTION

The present invention generally relates to an apparatus and process for improving the operation of an air separation unit during the pressurization step of an adsorber of a front end purification unit.

BACKGROUND OF THE INVENTION

For an air separation unit (ASU) facility to produce gaseous products, either gaseous oxygen (GOX) and/or gaseous nitrogen (GAN) at high pressure is vaporized by high pressure (HP) air from a booster air compressor (BAC) in the main heat exchanger.

FIG. 1 provides a representation of a process known heretofore. Referring to FIG. 1, a main air feed 2 is compressed in main air compressor (MAC) 10 to form a compressed main air stream 12. A first portion of compressed main air stream 14 is sent to front end purification (FEP) unit 20, wherein water and carbon monoxide are removed such that the air is suitable for cryogenic temperatures. In instances involving a BAC 30, the resulting dry air stream 22 can split into two streams, with a first portion 24 going to the cold box 40 at approximately the same outlet pressure as the MAC 10 (notwithstanding pressure losses within the system), while a second portion is further boosted in the BAC 30 to form a boosted stream 32. This boosted stream 32 is then introduced to the cold box 40 at a higher pressure than the first portion 24 such that the boosted stream 32 can provide additional refrigeration via expansion within the cold box 40.

FEP unit 20 includes a set of adsorbers that operate in a permutative fashion. While one adsorber A is operating in an adsorption cycle, the other adsorber P is being regenerated and then pressurized. During regeneration, the adsorber P is typically heated using a heated waste nitrogen stream from the cold box (not shown) and then cooled (also not shown) before being pressurized.

In a conventional ASU equipped with two or more front end purification (FEP) adsorbers a portion 16, typically between 4 to 5%, of the processed air from one adsorber A in production is used to re-pressurize the other adsorber P after regeneration and prior to being switched over and put online. Due to this processed air reserved for pressurization of other adsorber, the MAC 10 can only be set to operate at 4 to 5% most of time (less than 10%) below its maximum capability except for a short period of time when adsorber P is in pressurization step. Otherwise, a decrease of air to the process, and consequently, a process upset would occur during the pressurization. The inlet guide vane (IGV) must be readjusted to increase the process air flow proportional to the additional air required for the pressurization of the other adsorber. This conventional set up has a few major drawbacks:
- reduce the amount of continuous air that can be delivered by the MAC thus the production of the ASU;
- create a process upset to the ASU due to the change of the air flow by adjusting the IGV; and
- increase the size of the MAC in order to accommodate the additional air for pressurization.

Therefore, it would be desirable to have an improved apparatus and method that avoids these process disturbances and operates in an overall more efficient manner.

SUMMARY OF THE INVENTION

The present invention is directed to a method and apparatus that satisfies at least one of these needs. In one embodiment of the present invention, the MAC is set to run at a constant flow and a portion of the boosted stream is continually withdrawn and introduced into a high pressure buffer tank. Certain embodiments of the current invention make use of the availability of high pressure compressed dry air from the BAC for adsorber re-pressurization. This allows maintaining constant processed air for the ASU, and therefore, increases its throughput and eliminates the upset in the ASU compared to prior art.

In one embodiment, the invention can include a method for reducing process disturbances during pressurization of an adsorber in an air separation unit. In one embodiment, the air separation unit can include a front end purification unit, a main air compressor, a cold box having a main heat exchanger and a distillation column system disposed therein, a booster air compressor, and an air buffer tank, wherein the front end purification unit comprises a first adsorber and a second adsorber. In one embodiment, the method can include the steps of: pressurizing the first adsorber while the second adsorber operates in an adsorption cycle, wherein the step of pressurizing the first adsorber further comprises the steps of withdrawing a pressurized air stream from the air buffer tank and introducing the pressurized air stream to the first adsorber until the first adsorber is at a target pressure, wherein the air buffer tank is in fluid communication with the booster air compressor, wherein the method further comprises the step of continually sending a first portion of air flow from the booster air compressor to the air buffer tank and continually sending a second portion of air flow from the booster air compressor to the cold box for rectification therein.

In optional embodiments of the method for reducing process disturbances during pressurization of an adsorber in an air separation unit, the first portion of air flow from the booster air compressor is between 0.3% to 1% of total air flowing into the booster air compressor.

In another aspect of the invention, a method for reducing process disturbances during pressurization of an adsorber in an air separation unit is provided. In one embodiment, the method can include the steps of: compressing an air stream in a main air compressor to form a compressed main air stream; purifying the compressed main air stream in the front end purification unit to remove water and carbon dioxide to form a dry main air stream; sending a first portion of the dry main air stream to the cold box for cooling and rectification therein; boosting a second portion of the dry main air stream to a higher pressure $P_H$ in the booster air compressor to produce a boosted air stream; sending a first portion of the boosted air stream to the cold box for cooling and rectification therein; and sending a second portion of the boosted air stream to the air buffer tank, wherein each of the adsorbers of the front end purification unit undergoes a processing cycle comprising a regeneration cycle, a pressurization cycle, and an adsorption cycle, wherein during the pressurization cycle, a pressurized air stream is withdrawn from the air buffer tank and introduced to the adsorber that is undergoing pressurization.

In optional embodiments of the method for reducing process disturbances during pressurization of an adsorber in an air separation unit:
- the pressurized air stream is only withdrawn from the air buffer tank and introduced to the adsorber during the pressurization cycle;
- the flow rate of the second portion of the boosted air stream sent to the air buffer tank is between 0.3% to 1% of the flow rate of the second portion of the dry main air stream boosted by the booster air compressor; and/or
- the second portion of the boosted air stream is sent to the air buffer tank at a constant rate during the entire processing cycle of the front end purification unit.

In another aspect of the invention, an apparatus for reducing process disturbances during pressurization of an adsorber in an air separation unit is provided. In one embodiment, the apparatus can include:
a main air compressor configured to compress an air stream to form a compressed main air stream; a front end purification unit configured to purify the compressed main air stream of water and carbon dioxide to form a dry main air stream, wherein the front end purification unit comprises two adsorbers, wherein each adsorber is configured to operate with an adsorption cycle, a regeneration cycle, and a pressurization cycle; a booster air compressor in fluid communication with the front end purification unit, wherein the booster air compressor is configured to boost a second portion of the dry main air stream to a higher pressure $P_H$ to form a boosted air stream; an air buffer tank having an air inlet in fluid communication with an outlet of the booster air compressor, wherein the air buffer tank is configured to receive a second portion of the boosted air stream, wherein an outlet of the air buffer tank is in fluid communication with the front end purification unit; a cold box in fluid communication with the front end purification unit and the outlet of the booster air compressor, wherein the cold box is configured to receive the first portion of the dry main air stream and a first portion of the boosted air stream, wherein the cold box houses a main heat exchanger and a distillation column system, wherein the main heat exchanger is configured to cool the first portion of the dry main air stream and the first portion of the boosted air stream to a cryogenic temperature suitable for rectification of air, wherein the distillation column system is configured to receive the first portion of the dry main air stream and the first portion of the boosted air stream from the main heat exchanger after cooling, wherein the distillation column system is configured to separate the dry main air stream and the boosted air stream into nitrogen and oxygen; wherein during a pressurization cycle of each adsorber, a valve located between the air buffer tank and the front end purification unit is configured to open to allow for dry air to flow from the air buffer tank to the adsorber, wherein the valve is configured to close, thereby stopping the flow of dry air to the adsorber, once the pressurization cycle is completed.

In optional embodiments of the apparatus:
- the apparatus can also include means for regulating the flow rate of the second portion of the boosted air stream sent to the air buffer tank; and/or
- the flow rate of the second portion of the boosted air stream sent to the air buffer tank is between 0.3% to 1% of the flow rate of the second portion of the dry main air stream boosted by the booster air compressor.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

For an ASU to produce gaseous oxygen (GOX) product at high pressure, a typical choice of process configuration will be internal compression (pumping) cycle, in which liquid oxygen (LOX) is pumped to high pressure and vaporized by high pressure (HP) air in the Brazed Aluminum Heat Exchanger supplied from the BAC.

Certain embodiments of the current invention make use of the availability of high pressure compressed dry air from the BAC for adsorber re-pressurization. In one embodiment, a small stream of compressed dry air stream from BAC is sent to a dry air gas buffer tank. This dry air is preferably taken from downstream of the after-cooler of the final discharge of BAC, but can also be taken from any stage where the pressure is higher than the normal operating pressure of adsorber vessel as side draw. In such manner the gas buffer is being filled with compressed dry air by BAC continuously at a relatively small (equivalent to approximately 0.4% of the process air of BAC), but at constant rate while it is depleted in a short time (typically less than 10 minutes) during pressurization cycle. This arrangement enables both MAC and BAC to operate continuously at higher and constant capacity, and therefore, allows for an increased throughput of the ASU and also with improved stability. The arrangement can be particularly useful for debottlenecking of the MAC for existing facilities when external pressurized dry gas is unavailable, or for a new ASU where MAC capacity margin is limited by its frame size.

Figure 2:
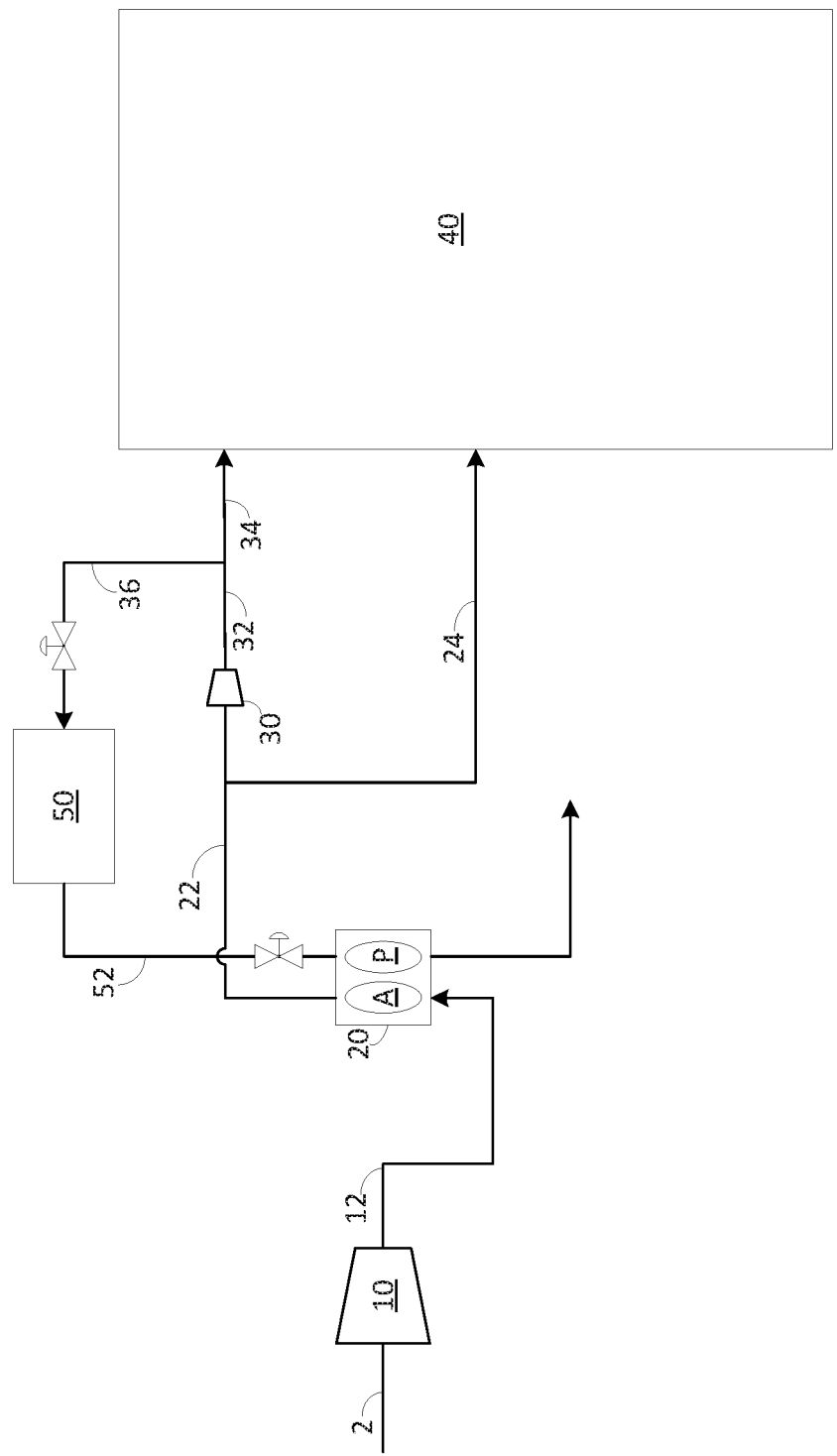
FIG. 2 shows an embodiment of the present invention.

FIG. 2 represents process flow diagram in accordance with an embodiment of the present invention. Referring to FIG. 2, main air feed 2 is compressed in main air compressor (MAC) 10 to form a compressed main air stream 12, which is then sent to front end purification (FEP) unit 20, wherein water and carbon monoxide are removed such that the air is suitable for cryogenic temperatures. In instances involving a BAC 30, the resulting dry air stream 22 can split into two streams, with a first portion 24 going to the cold box 40 at approximately the same outlet pressure as the MAC 10 (notwithstanding pressure losses within the system), while a second portion is further boosted in the BAC 30 to form a boosted stream 32. A first portion of boosted stream 34 is then introduced to the cold box 40 at a higher pressure than the first portion 24, such that the first portion of the boosted stream 34 can provide additional refrigeration via expansion and high pressure air for product vaporization within the cold box 40.

FEP unit 20 includes a set of adsorbers that operate in a permutative fashion. While one adsorber A is operating in an adsorption cycle, the other adsorber P is being regenerated and then pressurized. During regeneration, the adsorber P is typically heated using a heated waste nitrogen stream from the cold box (not shown) and then cooled (also not shown) before being pressurized.

Figure 1:
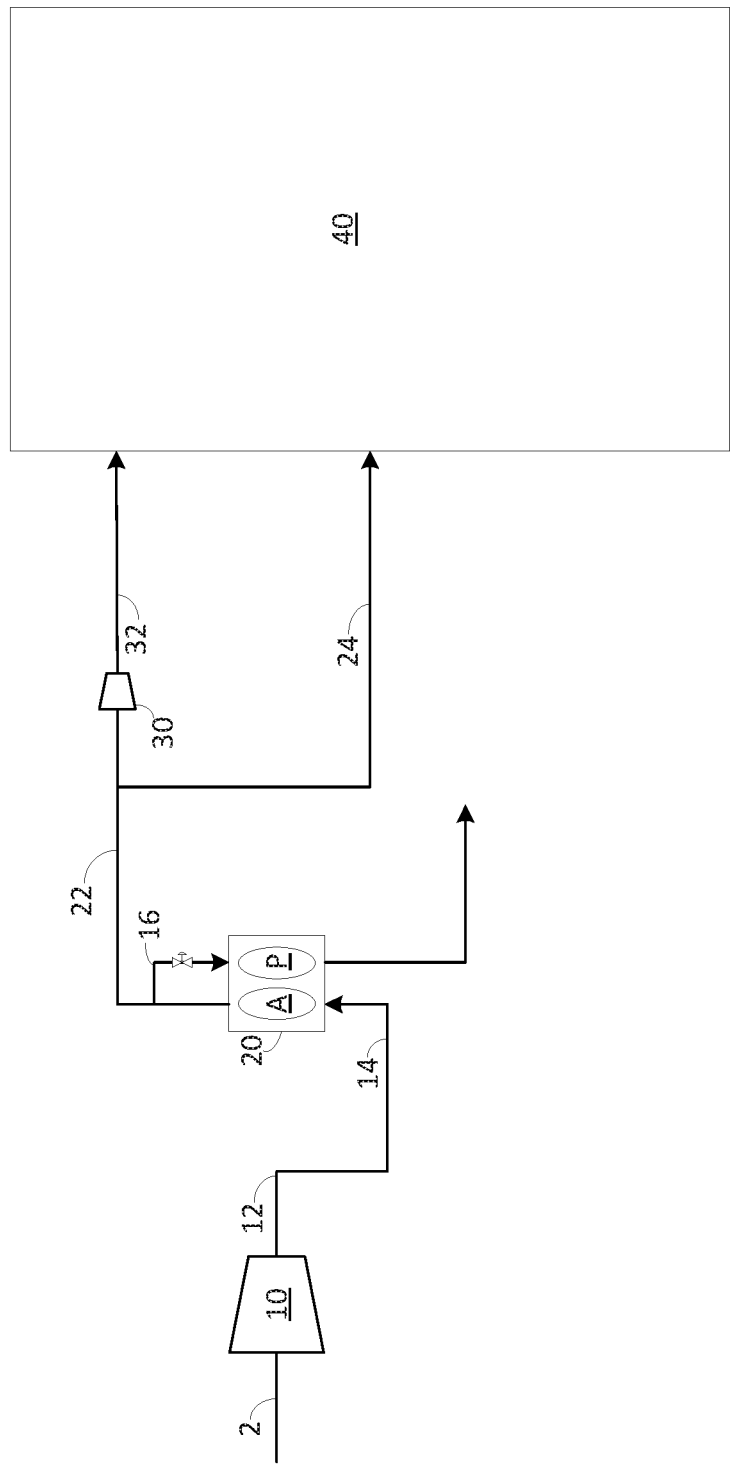
FIG. 1 shows an embodiment of the prior art.

Unlike in FIG. 1, the embodiment shown in FIG. 2 provides pressurization of adsorber P by using a pressurized air stream 52 from a high pressure buffer tank 50, which is filled during operation using second portion of boosted stream 36.

By utilizing a portion of the boosted stream instead of a portion of the dry air stream 16 as in FIG. 1 to pressurize the adsorber, a constant flow of air can be sent to the cold box and the inlet guide vanes of the MAC do not need to be altered during operation. This arrangement enables both MAC and BAC to operate at higher and constant capacity, therefore, to increase throughput of ASU and also to improve its stability. The arrangement can be particularly useful for debottlenecking of the MAC for existing facilities when external pressurized dry gas is unavailable or for a new ASU where MAC capacity margin is limited by its frame size.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. A method for reducing process disturbances during pressurization of an adsorber in an air separation unit, wherein the air separation unit comprises a front end purification unit, a main air compressor, a cold box having a main heat exchanger and a distillation column system disposed therein, a booster air compressor, and an air buffer tank, wherein the front end purification unit comprises a first adsorber and a second adsorber, the method comprising the steps of:
   pressurizing the first adsorber while the second adsorber operates in an adsorption cycle, wherein the step of pressurizing the first adsorber further comprises the steps of withdrawing a pressurized air stream from the air buffer tank and introducing the pressurized air stream to the first adsorber until the first adsorber is at a target pressure,
   wherein the air buffer tank is in fluid communication with the booster air compressor, wherein the method further comprises the step of continually sending a first portion of air flow from the booster air compressor to the air buffer tank and continually sending a second portion of air flow from the booster air compressor to the cold box for rectification therein.

2. The method as claimed in claim 1, wherein the first portion of air flow from the booster air compressor is between 0.3% to 1% of total air flowing into the booster air compressor.

3. A method for reducing process disturbances during pressurization of an adsorber in an air separation unit, wherein the air separation unit comprises a front end purification unit, a main air compressor, a cold box having a main heat exchanger and a distillation column system disposed therein, a booster air compressor, and an air buffer tank, wherein the front end purification unit comprises a first adsorber and a second adsorber, the method comprising the steps of:
   compressing an air stream in a main air compressor to form a compressed main air stream;
   purifying the compressed main air stream in the front end purification unit to remove water and carbon dioxide to form a dry main air stream;
   sending a first portion of the dry main air stream to the cold box for cooling and rectification therein;
   boosting a second portion of the dry main air stream to a higher pressure $P_H$ in the booster air compressor to produce a boosted air stream;
   sending a first portion of the boosted air stream to the cold box for cooling and rectification therein; and
   sending a second portion of the boosted air stream to the air buffer tank,
   wherein each of the adsorbers of the front end purification unit undergoes a processing cycle comprising a regeneration cycle, a pressurization cycle, and an adsorption cycle,
   wherein during the pressurization cycle, a pressurized air stream is withdrawn from the air buffer tank and introduced to the adsorber that is undergoing pressurization.

4. The method as claimed in claim 3, wherein the pressurized air stream is only withdrawn from the air buffer tank and introduced to the adsorber during the pressurization cycle.

5. The method as claimed in claim 3, wherein the flow rate of the second portion of the boosted air stream sent to the air buffer tank is between 0.3% to 1% of the flow rate of the second portion of the dry main air stream boosted by the booster air compressor.

6. The method as claimed in claim 3, wherein the second portion of the boosted air stream is sent to the air buffer tank at a constant rate during the entire processing cycle of the front end purification unit.

7. An apparatus for reducing process disturbances during pressurization of an adsorber in an air separation unit, wherein the apparatus comprises:
- a main air compressor configured to compress an air stream to form a compressed main air stream;
- a front end purification unit configured to purify the compressed main air stream of water and carbon dioxide to form a dry main air stream, wherein the front end purification unit comprises two adsorbers, wherein each adsorber is configured to operate with an adsorption cycle, a regeneration cycle, and a pressurization cycle;
- a booster air compressor in fluid communication with the front end purification unit, wherein the booster air compressor is configured to boost a second portion of the dry main air stream to a higher pressure $P_H$ to form a boosted air stream;
- an air buffer tank having an air inlet in fluid communication with an outlet of the booster air compressor, wherein the air buffer tank is configured to receive a second portion of the boosted air stream, wherein an outlet of the air buffer tank is in fluid communication with the front end purification unit;
- a cold box in fluid communication with the front end purification unit and the outlet of the booster air compressor, wherein the cold box is configured to receive the first portion of the dry main air stream and the first portion of the boosted air stream, wherein the cold box houses a main heat exchanger and a distillation column system, wherein the main heat exchanger is configured to cool the first portion of the dry main air stream and the first portion of the boosted air stream to a cryogenic temperature suitable for rectification of air, wherein the distillation column system is configured to receive the first portion of the dry main air stream and the first portion of the boosted air stream from the main heat exchanger after cooling, wherein the distillation column system is configured to separate the dry main air stream and the boosted air stream into nitrogen and oxygen;
- wherein during a pressurization cycle of each adsorber, a valve located between the air buffer tank and the front end purification unit is configured to open to allow for dry air to flow from the air buffer tank to the adsorber,
- wherein the valve is configured to close, thereby stopping the flow of dry air to the adsorber, once the pressurization cycle is completed.

8. The apparatus as claimed in claim 7, further comprising means for regulating the flow rate of the second portion of the boosted air stream sent to the air buffer tank.

9. The apparatus as claimed in claim 8, wherein the flow rate of the second portion of the boosted air stream sent to the air buffer tank is between 0.3% to 1% of the flow rate of the second portion of the dry main air stream boosted by the booster air compressor.

* * * * *